D. BEAUDRY.
CIRCULAR SAW ATTACHMENT.
APPLICATION FILED NOV. 5, 1913.
1,125,637.
Patented Jan. 19, 1915.
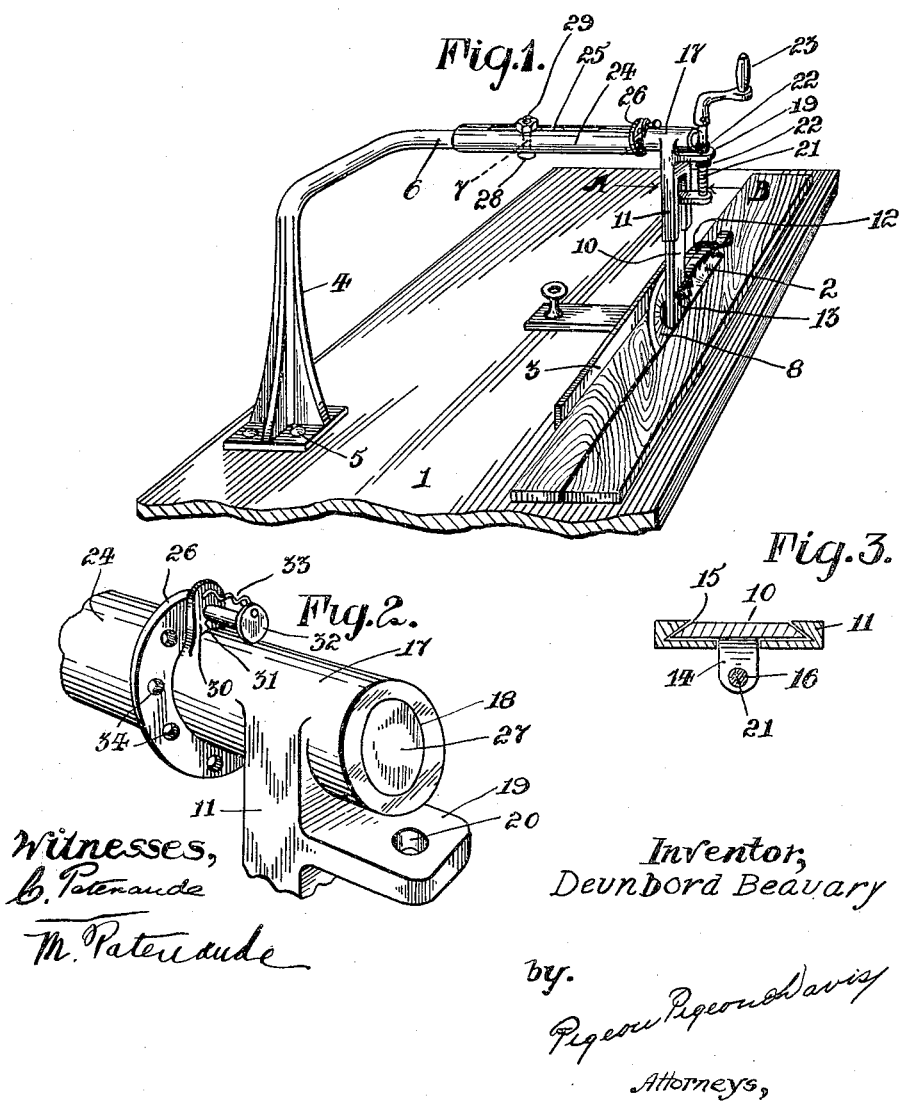
Witnesses,
C. Patenaude
M. Patenaude
Inventor,
Deunbord Beaudry
by
Pigeon Pigeon Davis
Attorneys,

UNITED STATES PATENT OFFICE.

DEUNBORD BEAUDRY, OF MONTREAL, QUEBEC, CANADA, ASSIGNOR OF ONE-HALF TO JOSEPH SABIN ST. ONGE, OF MONTREAL, QUEBEC, CANADA.

CIRCULAR-SAW ATTACHMENT.

1,125,637.     Specification of Letters Patent.     Patented Jan. 19, 1915.

Application filed November 5, 1913. Serial No. 799,291.

*To all whom it may concern:*

Be it known that I, DEUNBORD BEAUDRY, residing at the city of Montreal, in the Province of Quebec, in the Dominion of Canada, have invented certain new and useful Improvements in Circular-Saw Attachments; and I do hereby declare that the following is a full, clear, and exact description of the same.

The invention relates to improvements in circular saw attachments as described in the present specification and illustrated in the accompanying drawings that form part of the same.

The invention consists in a disk wheel adapted behind the circular saw to prevent the wood, especially the thinner wood, from jumping over the saw as often happens. The disk enters the split and helps the saw in dividing the wood, especially if the wood is green. This disk is adjustable and held in place by a sliding plate, sliding in a rack, the said rack being supported by an extensible arm which is adapted to a stand securely bolted to the saw table at any suitable part thereof. To the sliding plate is pivotally secured a protector for the saw to prevent accidents which so frequently happen.

In the drawings, Figure 1 is a perspective view of a portion of a circular saw table showing the attachment adapted thereon. Fig. 2 is an enlarged perspective view of the adjusting mechanism. Fig. 3 is an enlarged cross section on the line A—B through the rack.

Like numerals of reference indicate corresponding parts in each figure.

Referring to the drawings, 1 is the circular saw table having fitted thereon the usual circular saw 2 and guide 3.

4 is a stand, preferably of cast material secured to the table 1 by means of the bolts 5, said stand extending upwardly and outwardly in right angular shape at 6, the said end 6 having therein the bolt hole 7 shown in dotted lines.

8 is a disk plate beveled at its edge, and secured to the lower end of a plate 10 sliding in the way 11. The said disk plate 8 is so arranged as to enter the slit made by the saw and so free the latter.

12 is a protector plate for the saw, pivotally connected at 13, to the lower end of the plate 10 one end of the said protector plate resting on the wood to be sawed and completely covers the exposed edge of the saw.

14 is a lug at the upper end of the plate 10 and projecting outwardly through the slide way 15 from the said plate 10 and having the threaded hole 16.

The way 11 has the head 17 through which is a hole 18 horizontally bored and immediately below said head 17, projects the lug 19 having the hole 20 adapted to receive a threaded rod 21 which is threaded in the hole 16 of the lug 14.

22 are collars rigidly secured to the rod 21, and 23 is a crank. If the crank 23 is turned in one direction the threaded rod 21 passing through the hole 16 will raise the disk 8 and thus take the same out of engagement with the slit in the wood, or adjust it to any height required.

24 is a tube having the longitudinal slot 25 and the flange 26 at one end and having an outwardly extending end 27 of smaller diameter extending from said flange. The said tube engages the projecting rod or arm 6 and slides thereon, thus enabling the operator to extend or shorten the device according to the width of the table, 28 is a bolt passing through the bolt hole 7 and the slot 25, and 29 is a nut for securing same rigidly in any required position.

30 is a lug extending upwardly from the head 17 and having the hole 31 therein.

32 is a pin held to the lug 30 in the hole 31 by means of the small coil springs 33, the said pin engaging one of the holes 34 in the flange 26. By this means any inclination may be given to the plate 10.

This invention is very cheap to manufacture and a great improvement on the present circular saw attachments in not only protecting the operator, but in preserving and helping the saw.

What I claim is:—

In a circular saw attachment, the combination with the table and saw of a stand rigidly secured to said table and having an extension parallel to the axis of the saw, a tube telescoping on said extension and a bolt for locking same in an adjusted position on said extension, said tube having a collar on its outer end with a series of holes therearound, a right angular member whose one end pivotally engages the end of said tube beyond the collar, said member having a pin passing through a lug for engagement with said holes, a plate slidably engaging the other end of said member, a screw for adjusting the position of said plate in relation to the member and a disk rotatably mounted at the lower end of said plate and adapted to turn in the slit made by the saw in the wood.

Signed at Montreal, Quebec, Canada, this 25th day of August, 1913.

DEUNBORD BEAUDRY.

Witnesses:
M. PATENAUDE,
C. PATENAUDE.

Copies of this patent may be obtained for five cents each, by addressing the "Commissioner of Patents, Washington, D. C."